United States Patent [19]

Knight

[11] 4,209,192
[45] Jun. 24, 1980

[54] FLUID TRANSFER ADAPTER FOR CONNECTING A SINGLE CONDUIT TO A PLURALITY OF TANKER MANIFOLDS

[75] Inventor: Houston W. Knight, Whittier, Calif.

[73] Assignee: FMC Corporation, San Jose, Calif.

[21] Appl. No.: 915,422

[22] Filed: Jun. 14, 1978

[51] Int. Cl.² .............................................. F16L 55/00
[52] U.S. Cl. ..................................... 285/178; 285/181
[58] Field of Search ............... 285/181, 151, 152, 168, 285/178; 137/615; 141/387

[56] References Cited

U.S. PATENT DOCUMENTS

| | | | |
|---|---|---|---|
| 2,703,720 | 3/1955 | Warren | 285/276 |
| 3,176,730 | 4/1965 | Knight | 285/152 X |
| 3,479,065 | 11/1969 | Bahlke et al. | 285/151 |
| 3,664,386 | 5/1972 | Wenzel | 141/387 |
| 3,825,045 | 7/1974 | Bloomquist | 137/615 |
| 3,990,731 | 11/1976 | Schnipke | 285/181 |

FOREIGN PATENT DOCUMENTS 6709399  7/1968  Netherlands .............................. 285/181

*Primary Examiner*—Dave W. Arola
*Attorney, Agent, or Firm*—L. B. Guernsey; W. W. Ritt, Jr.; J. F. Verhoeven

[57] ABSTRACT

An adapter especially suited for transferring petroleum fluids from a single large-diameter loading arm to a plurality of smaller tanker manifolds, including a generally T-shaped connector having a large-diameter inlet housing at one end and a plurality of smaller diameter outlet housings at the other end thereof. The inlet housing of the connector is connected to the outboard end of the loading arm by a pair of large-diameter swivel joints and a pipe elbow. A plurality of eccentric fluid couplers are each connected to a corresponding one of the smaller outlet housings by one of a plurality of smaller swivel joints. These eccentric fluid couplers can be rotated into various positions to adapt to differences in spacings between the manifolds of various marine tankers.

7 Claims, 3 Drawing Figures

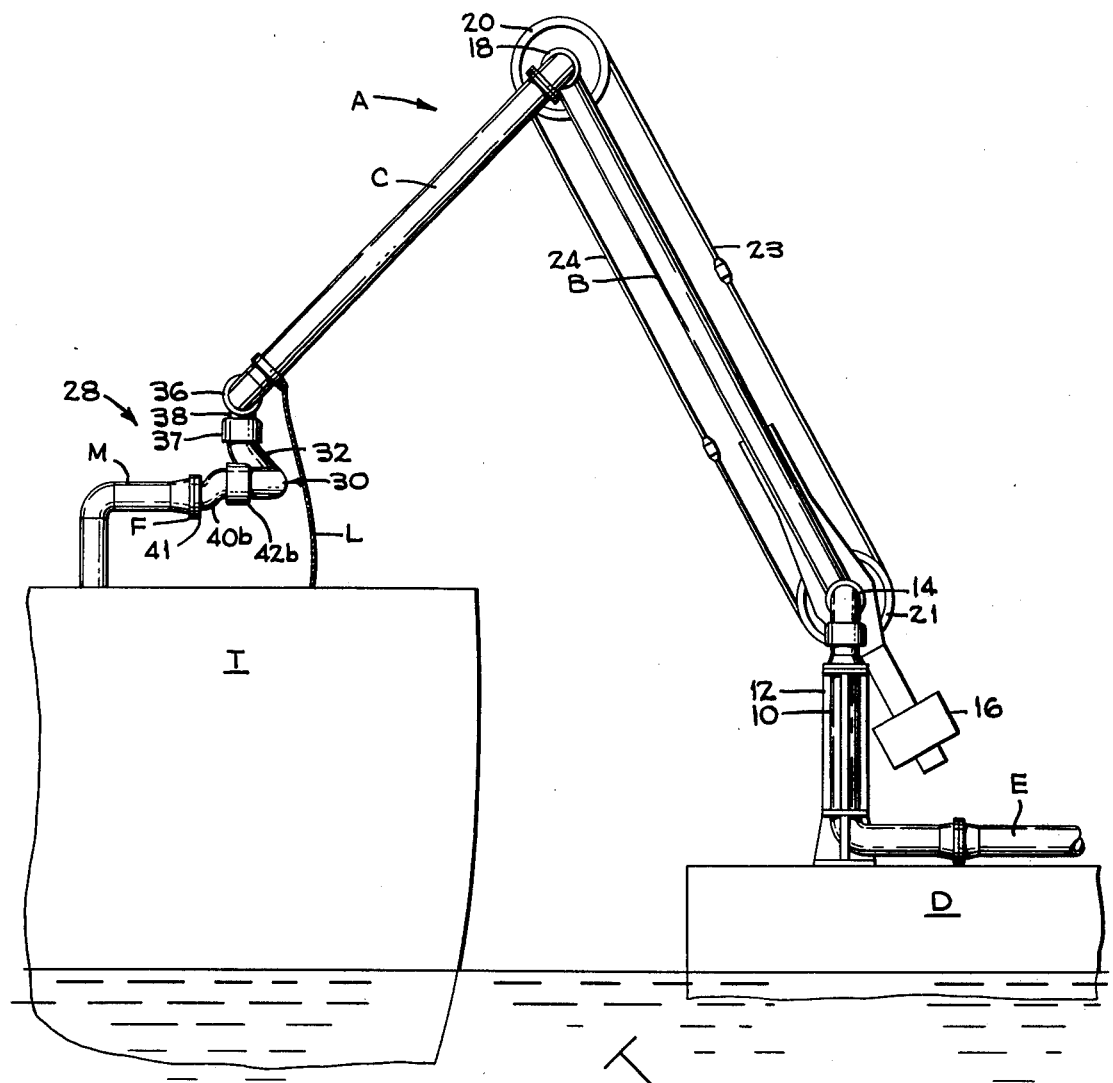
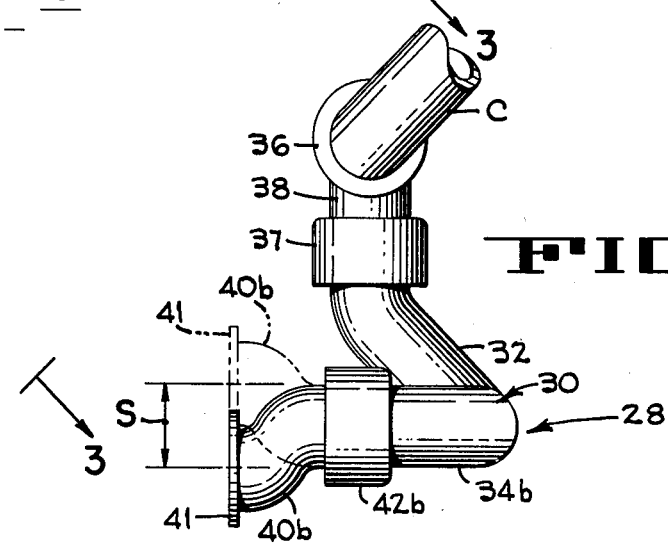

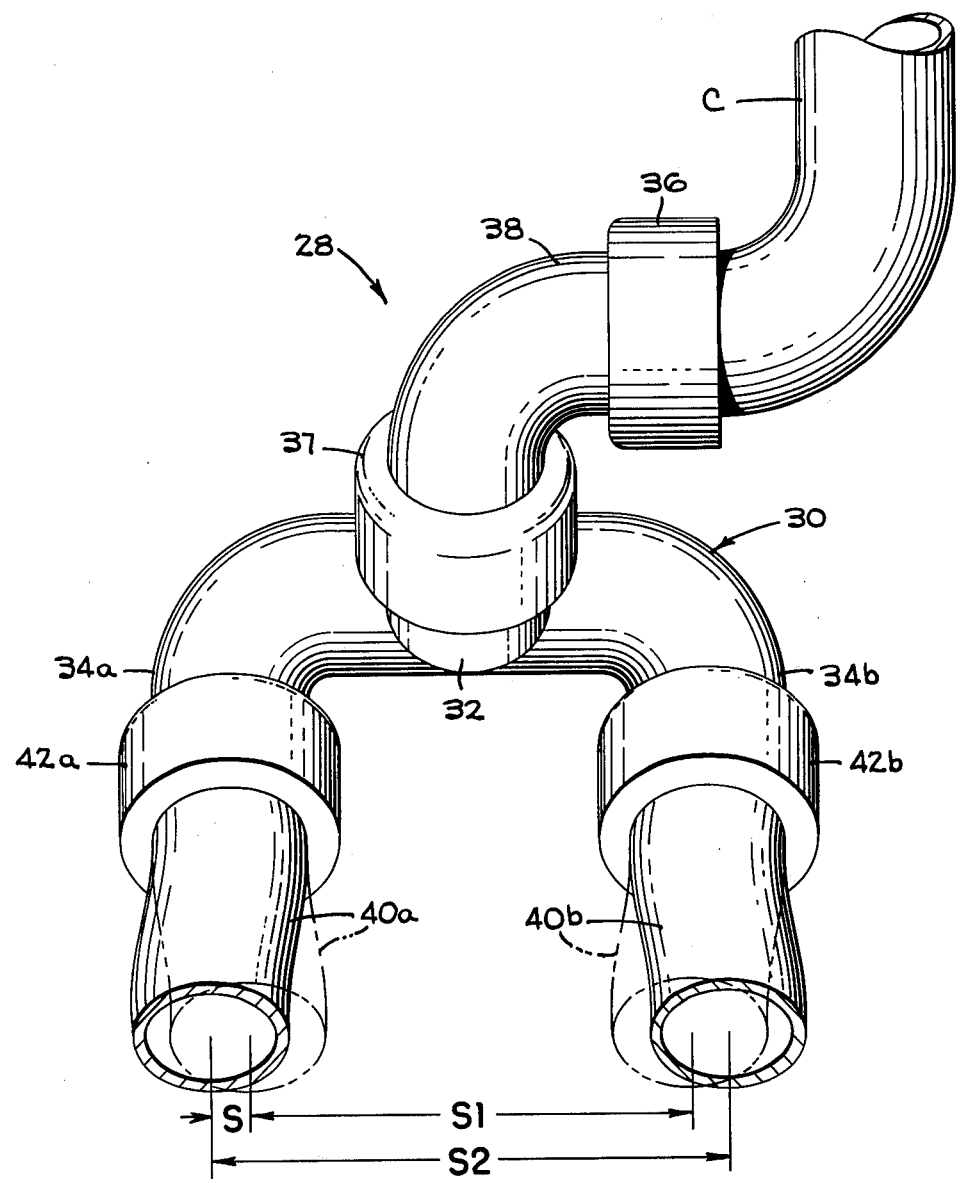
FIG_3

FLUID TRANSFER ADAPTER FOR CONNECTING A SINGLE CONDUIT TO A PLURALITY OF TANKER MANIFOLDS

BACKGROUND OF THE INVENTION

1. Field of the Invention

This invention relates to fluid loading systems, and more particularly to loading systems for transferring fluid between an offshore buoy and a marine tanker.

2. Description of the Prior Art

The production of oil and gas from offshore wells has developed into a major endeavor of the petroleum industry, and this growth has lead to the development of means for transporting petroleum products from offshore wells to shore-base refineries or storage facilities. Many of the wells are being drilled and completed in water where the use of marine tankers of very large capacity constitutes the most practical and efficient method of transporting the petroleum products. At some of these wells the water is too shallow for the marine tanker to load at the location of the well so that the petroleum must be transported by large diameter pipes or hoses to a terminal or a floating buoy several hundred or thousand feet from the well. Usually it is more convenient to transport the petroleum from the well area to the floating buoy in a single conduit having a diameter considerably larger than the diameter of the manifolds of the marine tankers, than it is to employ several small diameter pipes or hoses. The smaller hoses tend to tangle and become damaged, and a plurality of smaller pipes is expensive to install.

Each of the loading manifolds of a marine tanker is usually much smaller in diameter than the single conduit which is connected to the terminal or floating buoy. In order to decrease the loading time required to fill a marine tanker some of the existing terminals include a plurality or bank of articulated loading arms each having the inboard end of the arm connected to the single supply conduit, and with the outboard end of each arm connected to a separate marine tanker manifold. This plurality of articulated loading arms increases the expense of the installation and the complexity of control of the loading operation. What is needed is a single large-diameter loading arm having the inboard end connected to the supply conduit and having apparatus for connecting the outboard end to a plurality of marine tanker manifolds.

SUMMARY OF THE INVENTION

The present invention comprises an adapter for transferring fluid from a single large-diameter articulated loading arm to a plurality of smaller diameter tanker manifolds, and provides means for compensating for different spacings between manifolds from one marine tanker to another. The adapter includes a fabricated connector having a large-diameter passage for connecting to the loading arm, and a plurality of smaller diameter passages for connection to the manifolds on various marine tankers. A connecting means, including a swivel joint at either end and an elbow between the joints, interconnects the large passage and the loading arm. At each of the smaller passages a swivel joint is connected between the passage and an eccentric coupler. The coupler is adapted for connection to the marine tanker's manifold.

A single, relatively large diameter conduit is connected between the articulated loading arm and the well area where the petroleum is stored. The fluid is pumped through the large conduit to a spar buoy where the loading arm and the adapter are located. The fluid passes from the adapter into a plurality of tanker manifolds to facilitate fast loading of the tanker. This same system can be used for unloading a tanker at a port or terminal where the water is too shallow for the larger marine vessels. A spar buoy is anchored in deep water outside the port or terminal, and a long large-diameter conduit is connected between the spar buoy and the port or terminal. The adapter of the present invention is connected between the marine tanker mainfolds and the larger articulated loading arm to permit rapid unloading of the tanker.

BRIEF DESCRIPTION OF THE DRAWINGS

FIG. 1 is a side elevation of a marine loading arm including the fluid transfer adapter to the present invention.

FIG. 2 is an enlarged side elevation of the transfer adapter portion of FIG. 1, illustrating operation of the eccentric couplers.

FIG. 3 is an enlarged fragmentary view taken in the direction of the arrows 3—3 of FIG. 2 with portions broken away.

DESCRIPTION OF THE PREFERRED EMBODIMENT

An offshore loading system with a fluid transfer adapter according to the present invention comprises an articulated loading arm A (FIG. 1) including rigid inboard and outboard conduit members B and C, respectively, arranged substantially in end-to-end relation. The arm A is shown installed on a suitable supporting structure such as a spar buoy D for loading or unloading marine vessels. The inboard conduit member B is pivotally mounted on a vertically disposed riser pipe 10 for universal movement about intersecting horizontal and vertical axes so that it serves as a supporting boom for the outboard conduit member C, which member C is pivotally connected to the outer end of the inboard member B for movement relative thereto in a vertical plane. A hose or other tubular conduit E is connected to the inboard end of loading arm A to supply fluid thereto or to receive fluid therefrom. Since the outboard conduit member C is pivotally connected to the outer end of the inboard member B for movement about a horizontal axis, and since means are provided on the spar buoy D for moving the inboard member B about the mutually perpendicular axes of its universal mounting and for pivoting the outboard member C relative to the inboard member B, the distal end of the member A can be easily connected to the manifolds M of a marine tanker T.

The conduit E (FIG. 1) is connected to the vertically disposed riser pipe 10 which is supported on the spar buoy D by a frame 12. The inboard end of the articulated loading arm A is supported directly upon the riser pipe 10 through a horizontal swivel joint 14, and the weight of the arm A is counterbalanced by a counterweight 16.

The outboard conduit member C is balanced for movement about the horizontal axis through a swivel joint 18 by a pantograph system comprising a pair of sheaves 20, 21, a pair of cables 23, 24, and a second counterweight (not shown) in the manner commonly used in the art. The second counterweight can be heavy enough to retain the outer conduit member C in any position in which it is placed. The outboard conduit member C can be maneuvered into the working position shown in FIG. 1 by a tag line L.

A fluid transfer adapter 28, connected to the distal end of the outboard conduit member C, connects the single tubular conduit loading arm A to a pair of tanker manifolds M. The transfer adapter (FIG. 3) includes a generally T-shaped connector or pipe tee 30 having a single large annular inlet housing 32 at one end thereof, and a pair of slightly smaller annular outlet housings 34a, 34b at the other end. The inlet housing 32 is coupled to the distal end of the outboard conduit member C by a pair of swivel joints 36, 37 and an elbow 38. The inlet housing 32 includes an annular inlet passage having substantially the same cross-sectional area as the inner area of the conduit tube C and the elbow 38. Each of the outlet housings 34a, 34b is connected to a corresponding one of the eccentric couplers 40a, 40b by a swivel joint 42a, 42b. The distal end of each of the eccentric couplers includes a flange 41 (FIGS. 1 and 2) which is adapted for connection to a flange F of the tanker manifold M. The outlet housings 34a, 34b (FIG. 3) each include an annular passage having substantially the same cross-sectional area as the inner area of the tanker manifold. Typical inside diameter of the conduit C is 30 inches, while a typical inside diameter of the tanker manifold is 16 inches.

The eccentric couplers 40a, 40b (FIG. 3) are each in the form of a pair of interconnected pipe elbows, with each elbow having considerably less than a 90-degree bend. The couplers are in the general shape of the letter S with the two ends of the S extending along parallel axes. The exact amount of bending in each of the couplers is determined by the range of distances between centers of the tanker manifolds M. When one of the eccentric couplers 40a, 40b is rotated in the swivel joint, the outboard end of the coupler subscribes an arc in space with the distance between the distal ends of couplers 40a and 40b changing as the one coupler is rotated. The distance S, which the center of the distal end of each of the couplers moves as the coupler rotates, is shown in FIGS. 2 and 3. The pair of eccentric couplers 40a, 40b provide a continuous range of horizontal spacing between the distances S1 (FIG. 3) and S2. When the horizontal spacing between the adjacent tanker manifolds is less than the distance S2 and greater than the distance S1 the distal ends of the eccentric coupler 40a, 40b can move vertically relative to the conduit C to accommodate vertical movement of the tanker manifolds.

The fluid transfer adapter 28 provides means for coupling a single large diameter pipe or other conduit to a pair of smaller diameter tanker manifolds, and provides for connection to tanker manifolds having a predetermined range of distances between adjacent manifolds. The spacing between manifolds on marine tankers is usually between 7 feet and 8 feet, thus the distal end of each of the eccentric couplers should be able to vary horizontally at least 6 inches to accommodate the various manifold spacings.

Although the best mode contemplated for carrying out the present invention has been herein shown and described, it will be apparent that modification and variation may be made without departing from what is regarded to be the subject matter of the invention.

What is claimed is:

1. A fluid transfer adapter for connecting a single articulated loading arm to a pair of tanker manifolds, said adapter comprising:

a generally T-shaped connector having a single annular inlet housing and a pair of smaller annular outlet housings with an approximate 90 degree bend in said connector between said inlet housing and each of said outlet housings to align said outlet housings along parallel axes;

a pair of eccentric couplers;

a pair of swivel joints;

means for connecting each of said swivel joints between one of said eccentric couplers and a corresponding one of said outlet housings of said connector; and means for connecting said inlet housing to the outboard end of said articulated loading arm whereby said single loading arm simultaneously provides fluid to said pair of tanker manifolds.

2. A fluid transfer adapter as defined in claim 1 wherein each of said eccentric couplers includes: a pair of pipe elbows connected end to end, a radial flange at one end of said coupler, and means for connecting the other end of said coupler to one of said swivel joints.

3. A fluid transfer adapter as defined in claim 1 wherein each of said eccentric couplers comprises a pair of pipe elbows each having less than a 90-degree bend.

4. A fluid transfer adapter as defined in claim 1 including swivel joint means for connecting said inlet housing to the outboard end of said articulated loading arm.

5. A fluid transfer adapter as defined in claim 1 wherein said means for connecting said inlet housing to said loading arm includes a pair of swivel joints and a pair of pipe elbows, means for connecting a first swivel joint between said inlet housing and a first of said elbows, means for connecting a second swivel joint between said first and said second elbows, and means for connecting said second elbow to said outboard end of said articulated. loading arm.

6. A fluid transfer adapter as defined in claim 1 wherein each of said eccentric coupler includes an amount of bending which causes the outer end of said coupler to subscribe an arc in space as said coupler is rotated about the swivel joint connected to said eccentric coupler.

7. A fluid transfer adapter as defined in claim 1 wherein each of said eccentric couplers includes: an S-shaped section of pipe, a radial flange at one end of said section of pipe and means for connecting the other end of said section of pipe to one of said swivel joints.

* * * * *